United States Patent
Jansing et al.

[11] Patent Number: 5,178,970
[45] Date of Patent: Jan. 12, 1993

[54] HIGH-TEMPERATURE FUEL CELL

[75] Inventors: Thomas Jansing; Martin Turwitt, both of Bergisch Gladbach, Fed. Rep. of Germany

[73] Assignee: Interatom GMBH, Bergisch Gladbach, Fed. Rep. of Germany

[21] Appl. No.: 681,852

[22] Filed: Apr. 5, 1991

[30] Foreign Application Priority Data

Apr. 5, 1990 [DE] Fed. Rep. of Germany ....... 4011079

[51] Int. Cl.$^5$ ............................................ H01M 8/04
[52] U.S. Cl. ..................................... 429/38; 429/30; 429/33; 429/39
[58] Field of Search ..................... 429/30, 33, 38, 39

[56] References Cited

U.S. PATENT DOCUMENTS

| | | | |
|---|---|---|---|
| 4,395,468 | 7/1983 | Isenberg | 429/32 |
| 4,598,028 | 7/1986 | Rossing et al. | 429/30 |
| 4,631,238 | 12/1986 | Ruka | 429/30 |
| 4,666,798 | 5/1987 | Herceg | 429/12 |
| 4,997,727 | 3/1991 | Bossel | 429/33 |
| 5,034,288 | 7/1991 | Bossel | 429/38 |
| 5,049,459 | 9/1991 | Akagi | 429/33 |

FOREIGN PATENT DOCUMENTS

| | | |
|---|---|---|
| 0055011 | 6/1982 | European Pat. Off. . |
| 275661 | 7/1988 | European Pat. Off. . |
| 3437500 | 4/1985 | Fed. Rep. of Germany . |
| 3616878 | 11/1986 | Fed. Rep. of Germany . |

Primary Examiner—Olik Chaudhuri
Assistant Examiner—M. Nuzzolillo

[57] ABSTRACT

A high-temperature fuel cell includes two chambers to be acted upon by a reaction gas. A partition is formed of an oxygen-conducting ceramic material with a given coefficient of thermal expansion. The partition separates the chambers from one another and defines outer walls of the chambers opposite the partition and side walls of the chambers contacting the partition. Electrodes are each disposed at a respective side of the partition. The outer walls are formed of a soft metal sheet having at least one corrugation for compensation of expansion and the side walls are formed of a material with the given coefficient of thermal expansion. A high-temperature fuel cell stack may include a plurality of series-connected high-temperature fuel cells.

17 Claims, 2 Drawing Sheets

HIGH-TEMPERATURE FUEL CELL

The invention relates to a high-temperature fuel cell, including two chambers that can each be supplied with a reaction gas, a partition formed of an oxygen-conducting ceramic separating the chambers from one another, and an electrode on each side of the partition.

Such cells, which are known to those skilled in the art by the abbreviation SOFC (solid electrolyte fuel cell), exploit the fact that at elevated temperature, oxygen ions migrate through the crystalline structure of certain ceramics (for instance, through stabilized zirconium oxide) and build up an electrical potential in the process, which can be picked up and used either for measuring purposes (for instance in monitoring the oxygen content of exhaust gases) or as in the present case to create a source of electrical energy, in which current can be generated by combination of the oxygen with a gaseous fuel (such as hydrogen). Since the individual cells of the type described above have limited dimensions and only furnish relatively little energy (approximately 0.3 W/cm$^2$), a number of such cells are connected in a known manner in series and optionally in parallel as side by side as well, in order to obtain higher voltages or currents. The individual cells are in the form of flat blocks, which are stacked together into a composite structure.

The high temperature (of 1000° C. and above) at which the fuel cells must be operated in order to attain an acceptable yield, presents particular problems. Even if the chambers are manufactured from intrinsically high-temperature-proof materials, such as so-called superalloys based on nickel, the problem is not solved. Strains arise due to the dissimilar thermal expansions between the chamber walls and the foil (which must be necessarily gas-tight in the conventional sense) made of the oxygen-carrying ceramic separating the chambers from one another. Such strains either destroy the ceramic itself, or overload the solders used for connecting the ceramic to the metal structural components, at least at those connecting points.

A high-temperature fuel cell of the type addressed herein is known from German Published, Non-Prosecuted Application DE 34 37 500 A1 corresponding to Canadian Patent, No. 1,269,699 and U.S. Pat. No. 4,476,196 filed Oct. 12, 1983. That device has divided channels which are disposed at right angles to one another, for the reaction gases. A stack composed of a plurality of individual cells, which is provided with bus bars for drawing current at its ends, is described in German Published, Non-Prosecuted Application DE 36 16 878 A1, corresponding to U.S. Pat. No. 4,666,798. European Patent No. 0 055 011 B1, corresponding to U.S. Pat. No. 4,395,468, addresses the problems of unreliability and inadequate tightness of the metal/ceramic connections, which underlie the present invention as well. An attempt to overcome them in the form of a configuration of tubular cells in a "generator chamber" receiving the fuel appears not to be very successful from the standpoint of space. Finally, Published European Application No. 0 275 661 A1, corresponding to U.S. Pat. No. 4,816,036 shows a construction that includes layers of electrolyte, cathode, anode, and "connecting material", multiple layers of which are joined together and can be folded in zig-zag fashion to form channels for the reactands.

It is accordingly an object of the invention to provide a high-temperature fuel cell, which overcomes the hereinafore-mentioned disadvantages of the heretofore-known devices of this general type and which is more suitable for resisting high temperatures and the high speeds of temperature change necessary to attain these temperatures. The formation of the cell is intended to be particularly suitable for its installation in a composite structure of a plurality of such cells.

With the foregoing and other objects in view there is provided, in accordance with the invention, a high-temperature fuel cell, comprising two chambers each of which can be acted upon by a reaction gas, a partition having sides and being formed of an oxygen-conducting or carrying ceramic material with a given coefficient of thermal expansion the partition separating the chambers from one another and defining outer walls of the chambers opposite or facing the partition and side walls of the chambers contacting the partition, and electrodes each being disposed at a respective side of the partition, the outer walls being formed of a soft metal sheet having at least one bead or corrugation for compensation of expansion, and the side walls being formed of a material with the given coefficient of thermal expansion.

Due to its permeability, ceramic foil is unsuitable for forming the walls that close off the chambers on the outside. The outer walls are therefore made from a metal sheet. Compensation for the dissimilar expansion between the metal sheet and the ceramic frame takes place at the corrugations, not at the connecting points between the two components, and is also effected by providing that the side walls of the chambers contacting the partition are made of a material that has the same thermal coefficient of expansion as the material forming the partition itself.

In accordance with another feature of the invention, the side walls of the chambers contacting the partition are formed of the same material as the partition, such as zirconium oxide. The side walls of the chambers are in the form of flat frames, which are closed on one side by the partition and on the other by an outer wall. Such frames can be made of zirconium oxide, for instance, and also have the necessary strength for their manipulation and use as intended. Thermal strains between the frame and the foil-like partition, which in turn may have a textured form including indentations and/or grooves, can at most occur briefly during warmup or cool down phases, because the thin partition follows the temperature changes faster than the relatively solid frame. However, the resultant thermal strains are negligible.

In accordance with a further feature of the invention, the partition, the outer walls and the side walls are soldered, glued or sintered to one another.

In order to enable picking up the electrical voltage at both sides of the partition, the partition is provided with electrodes, which are likewise soldered on or sintered on. In order to make it easier to join a number of the above-described cells in the form of a stack, the electrodes are electrically conductively joined to the wall opposite them, according to the invention, so that the increased voltage effected by the series circuit is available at the ends of the stack. Therefore, in accordance with an added feature of the invention, there are provided electrically conductive connections each joining a respective one of the electrodes to a respective opposite one of the outer walls.

Problems also arise in achieving this electrically conductive connection, because of the dissimilar thermal expansion. The connection, which is provided in the form of a spacer between the partition and the outer wall, should be formed of a ceramic that has a coefficient of longitudinal thermal expansion that is as similar as possible, and that has good electrical conductivity, to avoid dissimilar thermal expansions along the longitudinal axis of the stack. However, the electrical resistance of the conductive ceramic is high.

Therefore, in accordance with an additional feature of the invention, the electrically conductive connection is in the form of a ceramic tube filled with a metal powder or a metal sponge. While the ceramic tube forms the structure, the metal powder or sponge, which has no strength of its own and accordingly can readily follow the dissimilar thermal expansions, takes on the task of current conduction.

In accordance with yet another feature of the invention, the ceramic tube has openings formed therein leading to the chamber that contains the reducing reaction gas. In this way it is assured that the metal powder or sponge is freed of oxides, which could reduce its conductivity.

With the objects of the invention in view, there is also provided a configuration of a plurality of series-connected fuel cells of the type described above which are stacked on one another, wherein the electrically conductive connections are passed through the sheets forming the outer walls of the various chambers and are tightly soldered to these sheets. The various cells are thus integrated into a total composite structure, without creating discontinuities that hinder the current transfer at the points of contact.

In accordance with yet a further feature of the invention, the side walls of the chambers have channels aligned with one another for carrying the reaction gases in and out, and the channels are provided with branched channels discharging into the corresponding spaces or chambers. Simple and reliable supply of the chambers with the reaction gases can thus be assured without additional piping or the like.

In accordance with a concomitant feature of the invention, the side walls of the chambers are divided into four (imaginary) sectors, the channels or feed lines for one reaction gas are disposed in a first sector while exhaust lines or channels therefor are disposed in a diametrically opposed third sector, feed lines or channels for a second reaction gas are disposed in a fourth sector and exhaust lines or channels therefor are disposed in a diametrically opposed second sector. This assures a good flow through the various chambers, and the flows in adjacent chambers flow with a course that is offset by 90° from one another.

Other features which are considered as characteristic for the invention are set forth in the appended claims.

Although the invention is illustrated and described herein as embodied in a high-temperature fuel cell, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
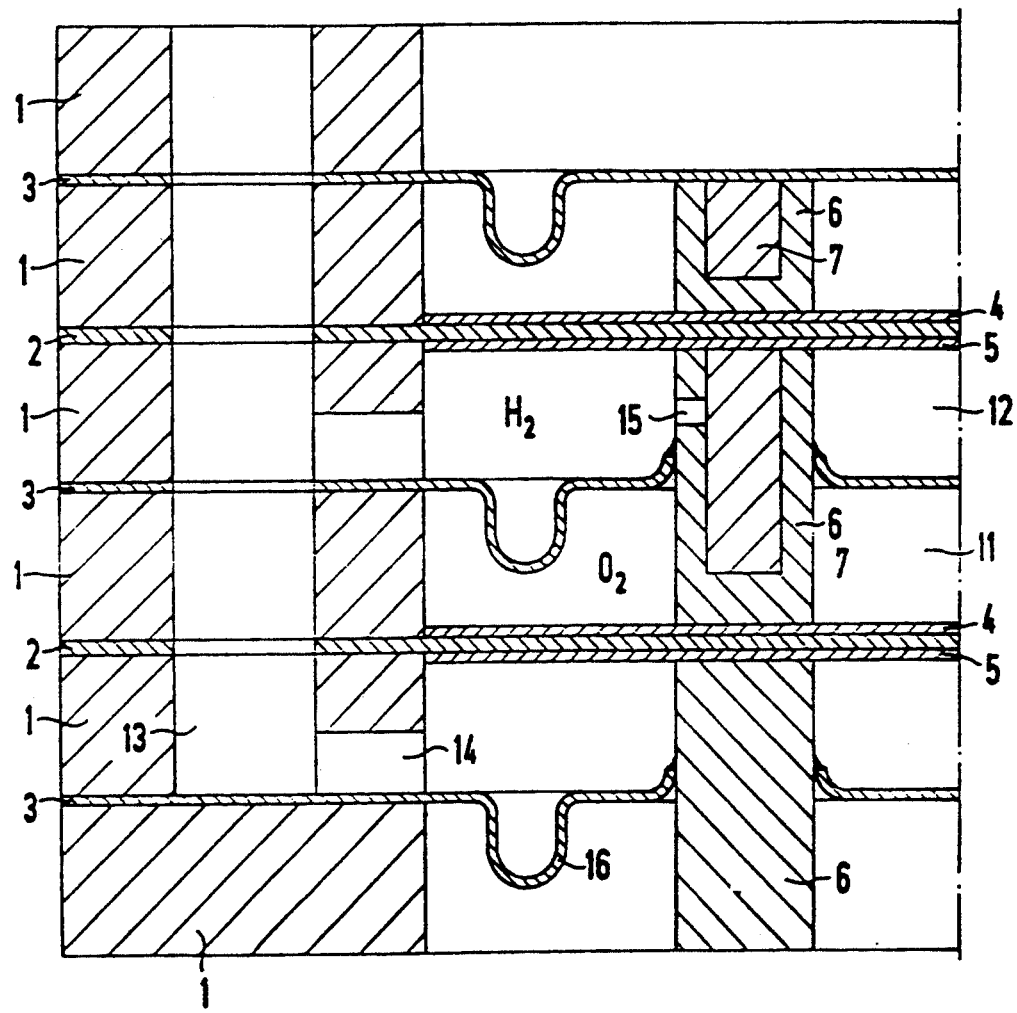
FIG. 1 is a fragmentary, diagrammatic, longitudinal axial-sectional view of a stack with two adjacent cells.

Referring now to the figures of the drawings in detail and first, particularly, to FIG. 1 thereof, there are seen individual frame parts 1 of stabilized zirconium oxide that are stacked on one another, with the interposition, in alternation, of a thin foil 2 forming one of the electrolytes and being likewise made of stabilized zirconium oxide, and a thin sheet 3 forming "outer walls" in the sense used herein, and being formed of a high-temperature-resistant steel. These correspondingly "soft" outer walls are provided with one corrugation 16, as is illustrated in this case, or optionally with a plurality of corrugations 16, for the purposes of compensation for expansion. Thus one first chamber 11 and one second chamber 12 are each formed in alternation for each cell. The first chambers 11 are supplied with oxygen $O_2$ at a high temperature, and the second chambers 12 are supplied with equally hot hydrogen $H_2$, through channels 13 disposed in mutual alignment in the frame parts 1, with branch channels 14 opening into the chambers. Oxygen ions diffuse through the partitions 2, which are heated by contact with the hot gases, and as a result an electrical potential is built up. The potential can be picked up at a cathode 4 and an anode 5, which are sintered onto the partition 2 at opposite sides. The cathode, for instance, is formed of lanthanum perovskite, and the anode is formed of a nickel oxide/zirconium oxide cermet. The cathodes 4 and anodes 5 are in the form of perforated foils. In order to connect the various cells in alignment with one another, conductive connections 6 are provided between each cathode 4 and an anode 5. In their simplest form, as shown at the bottom of FIG. 1, the connections may be in the form of a column made of a lanthanum oxide compound. A conductive connection 6 of an improved type which is shown above it, is in the form of a tube with a filling 7 of a nickel powder or nickel sponge. The tubes are provided with openings 15 leading to the second chambers 12, so that the reducing hydrogen can reach the filling 7 and free it of the oxides that hinder the passage of current. Therefore, the partition 2 separates the chambers 11, 12 from one another, the sheets 3 define outer walls of the chambers 11, 12 opposite the partition 2 and the frame parts 1 define side walls of the chambers 11, 12 contacting the partition 2.

Figure 2:
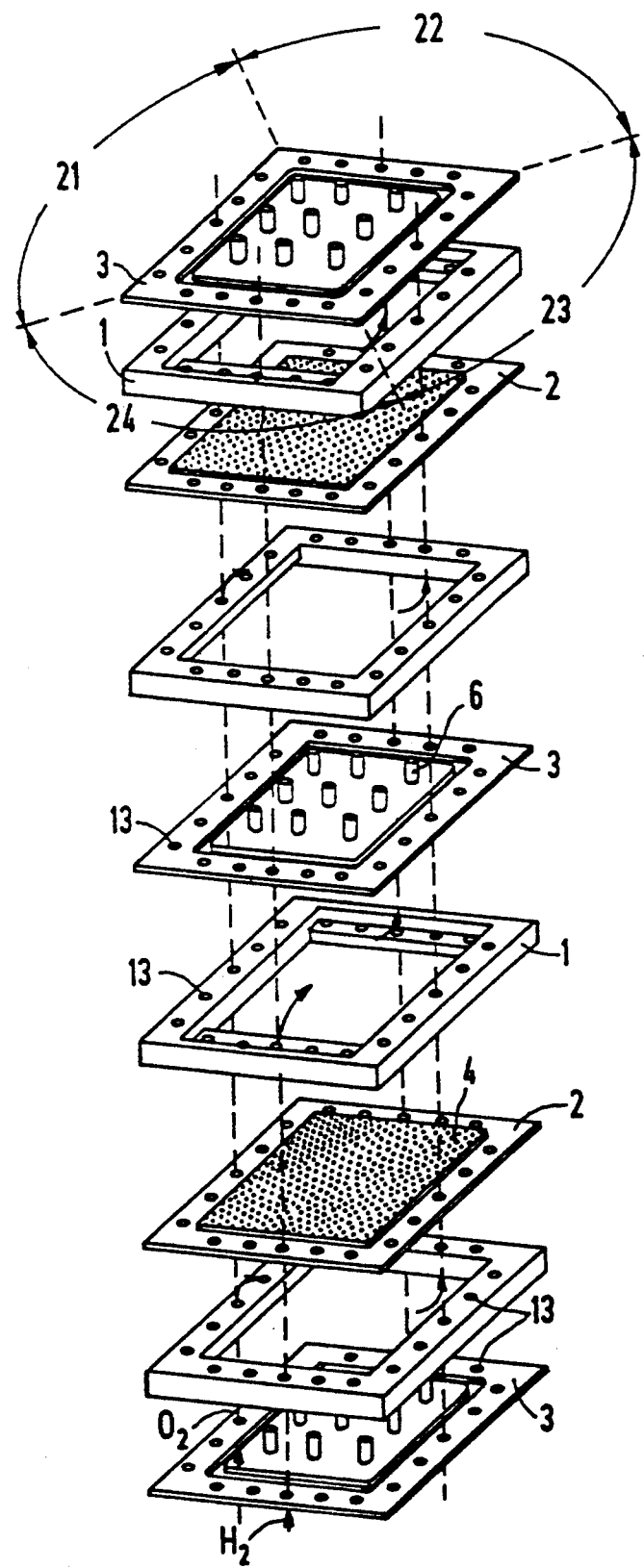
FIG. 2 is an exploded perspective view showing a stack of such cells and a gas flow control necessary for its operation.

FIG. 2 shows how a frame part 1, a partition 2, a frame part 1 and an outer wall 3 are always stacked on one another in the same order, with the latter being held in a spaced apart position by the conductive connections 6. The frame parts 1 are divided into imaginary first through fourth sectors 21-24 (which are not necessarily as shown in this case, where the boundaries of the sectors coincide with the corners of the frame parts 1). Beginning at the bottom, for instance, the oxygen flows through the channels 13 of the first sector 21, and in each case some of it passes through the corresponding branched channels 14 into the first chambers 11, leaves them again through the branched channels 13 of the third sector 23, and is passed on through the branched channels 13 of this same sector 23. By comparison, the hydrogen flows first into the channels 13 of the fourth sector 24, some of it passes through the corresponding branched channels 14 into each of the second chambers 12, and finally leaves them through the branched channels 14 and the channels 13 of the second sector 22. The electrical energy generated in the stack of fuel cells is finally picked up in a non-illustrated manner at the two outer walls 3 forming its closure.

We claim:

1. A high-temperature fuel cell, comprising:
   a) two chambers to be acted upon by a reaction gas,
   b) a partition having sides and being formed of an oxygen-conducting ceramic material with a given coefficient of thermal expansion, said partition separating said chambers from one another, and
   c) electrodes each being disposed at a respective side of said partition,
   d) outer walls of said chambers disposed opposite said partition and side walls of said chambers contacting said partition, said outer walls being formed of a soft metal sheet having at least one corrugation for compensation of expansion, and
   e) said side walls being formed of a material with said given coefficient of thermal expansion.

2. The high-temperature fuel cell according to claim 1, wherein said side walls of said chambers are formed of the same materials as said partition.

3. The high-temperature fuel cell according to claim 1, wherein said partition, said outer walls and said side walls are soldered to one another.

4. The high-temperature fuel cell according to claim 1, wherein said partition, said outer walls and said side walls are glued to one another.

5. The high-temperature fuel cell according to claim 1, wherein said partition, said outer walls and said side walls are sintered to one another.

6. The high-temperature fuel cell according to claim 1, including electrically conductive connections each joining a respective one of said electrodes to a respective opposite one of said outer walls.

7. The high-temperature fuel cell according to claim 6, wherein each of said electrically conductive connections is formed of a ceramic tube filled with a metal powder.

8. The high-temperature fuel cell according to claim 6, wherein each of said electrically conductive connections is formed of a ceramic tube filled with a metal sponge.

9. The high-temperature fuel cell according to claim 7, wherein said ceramic tubes have openings formed therein leading to said chamber for receiving a reducing reaction gas.

10. The high-temperature fuel cell according to claim 8, wherein said ceramic tubes have openings formed therein leading to said chamber for receiving a reducing reaction gas.

11. A high-temperature fuel cell stack, comprising a plurality of series-connected high-temperature fuel cells, each of said fuel cells including:
    a) two chambers to be acted upon by a reaction gas,
    b) a partition having sides and being formed of an oxygen-conducting ceramic material with a given coefficient of thermal expansion, said partition separating said chambers from one another,
    c) electrodes each being disposed at a respective side of said partition,
    d) outer walls of said chambers disposed opposite said partition and side walls of said chambers contacting said partition, said outer walls being formed of a soft metal sheet having at least one corrugation for compensation of expansion, and
    e) said side walls being formed of a material with said given coefficient of thermal expansion, and
    f) electrically conductive connections each joining a respective one of said electrodes to a respective opposite one of said outer walls, said electrically conductive connections passing through and being tightly soldered to said sheets forming said outer walls of said fuel cells.

12. The high-temperature fuel cell stack according to claim 11, wherein each of said electrically conductive connections is formed of a ceramic tube filled with a metal powder.

13. The high-temperature fuel cell stack according to claim 11, wherein each of said electrically conductive connections is formed of a ceramic tube filled with a metal sponge.

14. The high-temperature fuel cell stack according to claim 12, wherein said ceramic tubes have openings formed therein leading to said chamber for receiving a reducing reaction gas.

15. The high-temperature fuel cell stack according to claim 13, wherein said ceramic tubes have openings formed therein leading to said chamber for receiving a reducing reaction gas.

16. The high-temperature fuel cell stack according to claim 11, wherein said side walls of said fuel cells have mutually aligned channels formed therein for feeding and removing reaction gases, and said channels have branched channels discharging into said corresponding chambers.

17. The high-temperature fuel cell stack according to claim 16, wherein said side walls are divided into a first sector, a second imaginary sector, a third sector diametrically opposite said first sector and a fourth sector diametrically opposite said second sector, and said channels include channels for feeding a first reaction gas being disposed in said first sector, channels for removing the first reaction gas being disposed in said third sector, channels for supplying a second reaction gas being disposed in said fourth sector, and channels for removing the second reaction gas being disposed in said second sector.

* * * * *